(12) United States Patent
Morris et al.

(10) Patent No.: US 7,668,867 B2
(45) Date of Patent: Feb. 23, 2010

(54) ARRAY-BASED DISCOVERY OF MEDIA ITEMS

(75) Inventors: Ronald A. Morris, San Francisco, CA (US); Charles J. Migos, San Francisco, CA (US); David H. Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 11/276,937

(22) Filed: Mar. 17, 2006

(65) Prior Publication Data

US 2007/0220045 A1    Sep. 20, 2007

(51) Int. Cl.
*G06F 7/00* (2006.01)

(52) U.S. Cl. ................................ 707/104.1; 725/62

(58) Field of Classification Search ................ None
See application file for complete search history.

(56) References Cited

U.S. PATENT DOCUMENTS

| | | | |
|---|---|---|---|
| 5,864,868 A | 1/1999 | Contois | |
| 6,405,371 B1* | 6/2002 | Oosterhout et al. | 725/39 |
| 6,763,354 B2 | 7/2004 | Hosken | |
| 6,976,028 B2 | 12/2005 | Fenton et al. | |
| 2003/0110503 A1* | 6/2003 | Perkes | 725/86 |
| 2003/0022746 A1 | 12/2003 | Takeda | |
| 2004/0010409 A1* | 1/2004 | Ushida et al. | 704/246 |
| 2005/0076056 A1 | 4/2005 | Paalasmaa et al. | |
| 2005/0138066 A1* | 6/2005 | Finke-Anlauff et al. | 707/104.1 |
| 2006/0010472 A1* | 1/2006 | Godeny | 725/62 |
| 2006/0026643 A1 | 2/2006 | Silverberg et al. | |
| 2006/0136246 A1* | 6/2006 | Tu | 705/1 |
| 2006/0253874 A1* | 11/2006 | Stark et al. | 725/62 |

FOREIGN PATENT DOCUMENTS

WO    WO2005022528 A1    3/2005

OTHER PUBLICATIONS

Stent et al., "Using Event Segmentation to Improve Indexing of Consumer Photogrpahs," SIGIR '01, Sep. 9-12, 2001, New Orleans, Louisiana, pp. 59-65.
Graham et al., "Time as Essence for Photo Browsing Through Personal Digital Libraries," JCDL'02, Jul. 13-17, 2002, Portland, Oregon, pp. 326-335.

(Continued)

*Primary Examiner*—Pierre M Vital
*Assistant Examiner*—Truong V Vo
(74) *Attorney, Agent, or Firm*—Lee & Hayes, PLLC

(57) ABSTRACT

A media discovery module (MDM) is described that facilitates a user's access to desired media items. The MDM presents a series of arrays of media items to the user. The user's selection within any array governs the composition of media items that are presented in a subsequent array. Different linking criteria can define the relationship among arrays. In one case, the MDM uses a time-based linking criterion, allowing a user to examine a media item at increasing levels of temporal granularity. In another case, the MDM uses a subject matter-based criterion, allowing a user to examine one or more media items at increasing levels of detail with respect to a subject matter index. The MDM can employ various tools to establish the relationship among media items, including image analysis tools, audio analysis tools, metadata analysis tools, and so on.

18 Claims, 14 Drawing Sheets

OTHER PUBLICATIONS

Rodden et al., "Does Organisation by Similarity Assist Image Browsing?," SIGCHP01, Mar. 31-Apr. 4, 2001, Seattle, Washington, pp. 190-197.

Balabonović et al., "Storytelling with Digital Photographs," CHI Letters, vol. 2, Issue 1, 2000, pp. 564-571.

Wenyin et al., "MiAlbum—A System for Home Pboto Management Using the Semi-Automatic Image Annotation Approach," Proceedings of the Eighth ACM International Conference on Multimedia, 2000, pp. 479-480.

Loui et al., "A Software System for Automatic Albuming of Consumer Pictures," Proceedings of the Seventh ACM International Conference on Multimedia (Part 2), 1999, pp. 159-162.

Kuchinsky et al., "FotoFile: A Consumer Multimedia Organization and Retrieval System," Proceedings of the CHI 99 Conference on Human Factors in Computing Systems, 1999, pp. 496-503.

Bederson, Benjamin, "Quantum Treemaps and Bubblemaps for a Zoomable Image Browser" ACM Conference on User Interface and Software Technology, College Park, MD, USA, May 2001, pp. 71-80.

* cited by examiner

Define your discovery preferences:

Partition by:

- Time ☐
- Subject Matter ☑
    - Automatically Select Partition Criteria ☐
    - Partition by: ☑
        - Content ☑
            - Audio Recognition ☑
            - Image Recognition ☑
        - Metadata ☑
            - EPG Data ☑
            - Closed-Captioning Data ☐
            - Etc. ☐
- Etc. ☐

( Save Discovery Preferences )

ARRAY-BASED DISCOVERY OF MEDIA ITEMS

BACKGROUND

As media delivery technology matures, it has become increasingly feasible to offer a relatively large number of media items to users. Currently, for instance, many commercial systems allow the users to select from hundreds of channels. Future systems that incorporate IP-based media streaming technology and Video-on-Demand (VOD) technology are expected to offer even greater numbers of media items to users. In general, it is advantageous to provide users with a large number of items because this makes it more likely that the users will find items that match their respective interests.

However, the above-described improvements in media delivery technology also pose a number of new challenges. For instance, a user may find it time-consuming and cumbersome to search through a large number of media items to find a suitable media item. When the user selects a desired media item, the user may then wish to advance to a particular juncture in the media item, such as a particular scene in a movie. Again, a user may find it time-consuming and cumbersome to find a particular part of a selected media item. For instance, a user typically performs this task by tediously scanning forward or backward within a media item in a 2× or 3× mode of presentation.

The industry has provided a number of tools to help the user select media items, and once a media item is selected, to locate a particular part within the selected media item. For instance, some commercial providers provide an electronic program guide (EPG) having color-coded entries. That is, a commercial provider may group channels into different categories and assign different colors to respective categories. The EPG can apprise the user of the category of a channel by displaying the channel's metadata in a prescribed color or displaying the metadata over a background having the prescribed color.

As to navigation within an individual media item, digital video disk (DVD) technology commonly incorporates a grid-based scene selection mechanism. Different entries in the grid represent predefined parts of the media item, such as different predefined "chapters" within a movie. The user can advance to a desired scene of the media item by activating an associated entry within the grid.

Nevertheless, there remains room for improvement in techniques used to discover and access media content. There is specifically a need for more user-friendly and versatile techniques for discovering and accessing media items. For instance, the above-described color-coded EPG still presents a large amount of information to the user; consequently, the user may still have difficulty in visually "sifting" through this EPG information and selecting a desired media item. The above-described DVD technology's grid-based navigation technique provides some convenience in locating predetermined bookmarked content within a movie, but this technique does not otherwise accommodate the more varied and refined discovery-related needs of a user.

Similar challenges exist in other applications. For instance, many users now archive a relatively large number of digital photographs. There is a need for more effective techniques for discovering and accessing one or more photographs of interest from a larger collection of digital photographs.

SUMMARY

The following description sets forth functionality for discovering media items using an array-based navigation technique. In this technique, the functionality presents a first array of media items from which a user may select. The media items may represent entirely different media resources and/or different parts of a single media resource. When the user selects a particular media item within the array, the functionality presents a second array of media items. The media items in the second array have a relationship to one or more characteristics of the selected media item in the first array. In a similar manner, the user may select a particular item in the second array, prompting the functionality to present a third array of media items, and so on.

In one implementation, a time-based relationship ties the above-described series of arrays together. For instance, the first array may contain media items that represent n time segments that together comprise a movie. The second array may contain media items that represent n smaller time segments within a particular segment identified via the first array. The third array may contain media items that represent still smaller time segments within a particular segment identified in the second array, and so on. Through this provision, the user may iteratively drill down to a particular point within the movie, with the arrays becoming increasingly fine-grained with each iteration.

In another implementation, a subject matter-based relationship ties the above-described series of arrays together. For instance, the first array may contain media items that represent n genres of programming provided by a media provider. The second array may contain media items that represent n more refined sub-genres within a particular genre identified via the first array. The third array may contain media items that represent still more refined genres within a particular sub-genre identified in the second array, and so on. Through this provision, the user may iteratively drill down to a particular collection of media items that feature a topic of interest to the user. The characteristics of media items can be assessed using different techniques, such as by examining the metadata associated with the media items, by analyzing the image and/or audio content associated with the media resources, and so forth.

The above functionality confers a number of benefits. According to one exemplary benefit, the functionality provides a user-friendly and efficient means to quickly access media items. The unique visual nature of the array-based paradigm is particularly advantageous. Namely, this paradigm empowers a user to efficiently navigate through a potentially large collection of media items by drilling into this collection along a coherent user-selected path, without overwhelming the user at any stage in the selection process with too many choices. In other words, the paradigm provides a manageable portal into a rich underlying collection of media items without overwhelming the user with too much visual "clutter."

The subject matter set forth in this Summary section refers to exemplary manifestations of the invention, and hence does not limit the scope of the invention set forth in the Claims section.

BRIEF DESCRIPTION OF THE DRAWINGS

FIG. 8 shows an exemplary user interface presentation through which a user can enter general navigation-related preferences prior to the commencement of a media discovery session.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth functionality for discovering and accessing media items. The term "media item" as used herein has broad connotation. In one exemplary application, the media items pertain to different media resources. In this application, the functionality can be used to select one or more media resources from a larger pool of media resources. In another application, the media items pertain to different parts of a single media resource. In this application, the functionality can be used to select one or more parts from a larger number of parts within the media resource.

The term "media resource" likewise has broad connotation. In the example most commonly evoked herein, a media resource corresponds to an audio-visual program, such as a movie, a television program, and so on. However, a media resource can also refer to a photograph, a digitized drawing, an audio resource, and so on.

This disclosure includes the following sections. Section A sets forth exemplary user interface presentations that embody the discovery strategies featured herein. Section B sets forth an exemplary system for providing the user interface presentations of Section A. And Section C sets forth exemplary procedures for providing the user interface presentations of Section A.

A. Exemplary Appearance and Behavior of the User Interface Presentations (FIGS. 1-9)

A.1. Overview of the User Interface Presentations (FIG. 1)

Figure 1:
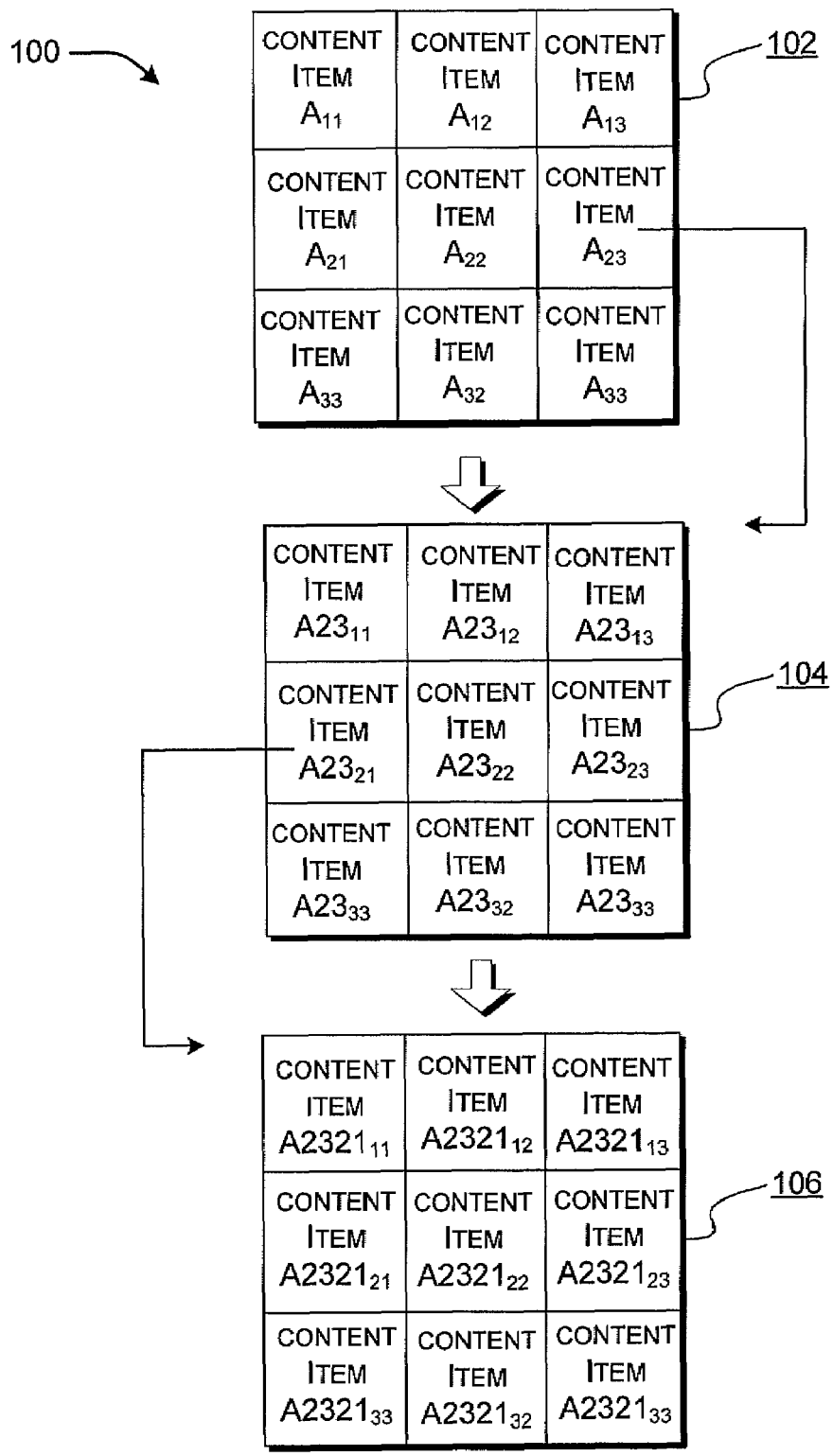
FIG. 1 shows an exemplary user interface strategy for iteratively locating a desired media item via a series of arrays of media items.

FIG. 1 shows an overview of one implementation of an array-based discovery technique. Broadly stated, in this technique, the user locates one or more desired media items by sequencing through a series of arrays 100. As will be set forth in Section B, the functionality which provides this series of arrays 100 is referred to as a Media Discovery Module (MDM).

FIG. 1 shows that the user sequences through three arrays of media items, including array 102, array 104, and array 106 (in the identified sequence of array 102 first, then array 104, and then array 106). More generally, however, the user can sequence through any number of arrays, from one array to N arrays.

FIG. 1 shows that the arrays (102, 104, 106) each comprise 3×3 collections of media items. But this is just one example. In a more general case, an array can comprise an n×m matrix of media items. For example, as will be shown in later figures, the arrays may comprise 1×9 film strips of media items. In other examples, the arrays need not conform to rectangular matrices.

As noted above, the term "media item" is to be interpreted liberally. In one case, a collection of media items may represent different media resources, such as different television programs, VOD movies and other on-demand resources, games, photographs, dating profiles, audio resources, and so on. In another case, the collection of media items may represent different parts within a single media resource, such as different scenes within a movie, or different collections within a photo album, different parts of a song, and so on. In another case, the collection of media items may represent a combination of the first two cases, that is, in which some media items represent different media resources and other media items represent different parts within a single media resource. To facilitate discussion, the following explanation will not always distinguish whether the illustrated media items represent individual media resources (such as movies, photographs, audio resources, etc.) or parts of a single media resource (such as scenes within a single movie, or parts of a song, etc.); it is to be understood that any of the examples can be applied to either (or a combination) of these scenarios.

In any event, each array contains a collection of visual entries which represent the media items. The visual entries can comprise small-sized pictures that represent the media items. For example, in the case of a movie, the visual entries can represent frames from different parts of the movie. In the case of a collection of photographs, the visual entries can represent small-sized versions of the photographs. In the case of audio resources, the visual entries can represent sound wave snippets of the audio resources. In other cases, the visual entries can provide textual and/or pictorial metadata that merely describes the media items. Still other ways of representing media items are possible.

The behavior of the MDM will now be described. In the illustrative case of FIG. 1, the MDM first presents the 3×3 array 102 of media items to the user. In one case, the MDM can use a default rule to select the initial collection of nine media items shown in the array 102. For instance, in one case, the MDM can present a collection of media items that represent different time segments within a movie, each having a duration of $$\frac{\text{total\_time}}{9},$$

where total_time is a total amount of time in the movie. In another case, the MDM can present a collection of media items that represent different kinds of media resources being offered. For example, a media provider may offer 500 channels of different kinds (such as news channels, sports channels, music channels, comedy channels, nature channels, and so on). The MDM can group the channels into nine categories and assign a representative media item to each category for presentation in the initial array 102. Still other techniques can be used to select the initial array 102 of media items.

Each entry in the initial array 102 of media items is linked to respective sub-arrays of media items. A sub-array can be invoked by activating a particular media item in the initial array 102 of media items. For instance, in the illustrative case of FIG. 1, the user has activated a media item labeled as item $A_{23}$ in the initial array 102. This prompts the MDM to display a second array 104 of media items.

Different rules can govern how media items in one array are linked to other arrays. The different rules are based on one or more linking criteria. In one case, the linking criterion is a temporal criterion. In this case, activation of the media item $A_{23}$ prompts the MDM to divide the time interval spanned by this media item into nine sub-intervals, and to present nine media items in the array 104 that represent the nine sub-intervals. For instance, if a movie is 2 hours long, then each interval in the initial array 102 represents a 14 minute time segment (approximately), and each interval in the second array 104 represents a 1.5 minute time segment (approximately) within the time segment associated with media item $A_{23}$. The middle entry in the second array 104 ($A23_{22}$) can represent a 1.4 minute time segment that is temporally positioned in the middle of the 14 minute parent time segment $A_{23}$ of the first array 102.

In another case, the linking criterion is a subject matter-related criterion. In this case, activation of the media item $A_{23}$ prompts the MDM to divide the subject matter represented by the media item $A_{23}$ into nine smaller sub-topics, and to present media items in the array 104 that represent the nine sub-topics. For instance, if the content item $A_{23}$ represents action films, then each media item in the second array 104 can represent different types of action films, such as spy-type action films, western-type action films, martial arts-type action films, and so on. This kind of subject matter-related linking criterion can identify different media resources (such as different movies), or can identify different parts within a single media resource. As to the later case, the subject matter-related linking criterion can be used to identify scenes within a movie that pertain to an identified topic, such as all scenes that contains martial arts, etc. In one exemplary and non-limiting case, one of the members in the second array 104 can include the activated parent media item in the first array 102 (i.e., media item $A_{23}$). For instance, the centrally-disposed media item $A23_{22}$ in the second array 104 can be the same item as the parent media item $A_{23}$ in the first array 102. This feature will be clarified in the examples which follow.

The term "subject matter" in the above discussion should be construed broadly. For instance, the following subject matter-related linking criteria can be used to assembly an array of media items.

Theme. One criterion can represent a theme of the media items, such as a news-related theme, a comedy-related theme, a sports-related theme, and so on.

Source. Another criterion can represent a source of the media items, such as the channel or commercial provider which furnishes the media items.

Content. Another criterion can represent elements that are found within the media items. For instance, one content-related criterion can be used to group together media items that feature the same actor. Another content-related criterion can be used to group together media items that have a similar visual appearance, such as films having lighting that is predominately bright and colorful (as is common in children's programming). Another content-related criterion can be used to group together media items that have similar audio content, such as programming that is predominately quiet (as opposed to action films that may feature explosions, gunfire, etc.). Another content-related criterion can include programming which omits certain undesirable content, such as visual and audio content that features mature themes, violence, and/or language that might be inappropriate for children. For instance, the media content item $A_{23}$ may generally represent programming that omits violence and foul language, and each individual media entry in the array 104 may represent a specific instance of programming that is suitable for children.

In order to perform the above-described linking behavior, the characteristics of a collection of media items need to be assessed. In one case, the characteristics of the media items can be determined in offline fashion, prior to the user conducting a particular discovery session. In another case, the characteristics of the media items can be determined in dynamic fashion while the user is conducting a discovery session. Another case combines both offline and dynamic processing.

The characteristics can be determined using various tools. In one case, the characteristics of the media items can be determined based on metadata associated with the media items. Metadata includes electronic program guide (EPG) data associated with the media items (such as information regarding the titles of the media items, the subject matter of the media items, the artists that appear in the media items, and so forth). Other metadata can include close-captioning data associated with the media items, which can be mined to assess the type of content associated with the media items. In another case, the characteristics of the media items can be determined based on analysis of the audio and/or visual content of the media items. For instance, the MDM can apply face recognition analysis to find media items that feature the same person, scene recognition analysis to find media items that feature the same landscape or cityscape, and so forth. The MDM can also apply audio analysis to find media items that feature the same kinds of sounds voiced by a human, e.g., so as to identify media items that feature the same speaker, to identify media items that contain the same words, to identify media items that omit certain words, to identify media items that share the same natural language, and so on. The MDM can also apply audio analysis to find media items that feature the same kinds of nonlinguistic sounds, e.g., so as to identify media items that feature the same kinds of music (e.g., classical music as opposed to rock music, etc.), to identify predominantly quiet music, and so on. The MDM can apply yet other tools to assess the characteristics of the media items.

In any case, a single array of media items may be used to invoke different analysis tools depending on the selections made by the user. For instance, if the user activates a first media item in the initial array of media items then a first analysis tool is invoked (such as face recognition to locate scenes that include a certain actor); if the user activates a second media item in the initial array of media items then a second analysis tool is invoked (such as some other image analysis technique to detect landscapes that include certain features).

The above-described selection process can be iteratively continued through additional levels. At each level, the MDM presents the user with another array of media items from which to select; activation of a media item in an array at any level will prompt the MDM to present another array of media items. For instance, activation of a media item $A23_{21}$ in the array 104 will prompt the MDM to present a third array 106 of media items. The third array 106 can contain media items that represent a further partitioning of some aspect of the media item $A23_{21}$ according to an applied linking criterion (or according to plural applied linking criteria). For instance, if the linking criterion is a temporal linking criterion, then the media items in the third array 106 represent nine time segments that compose a video snippet represented by media item $A23_{21}$. If the linking criterion is a subject matter-related criterion, then the media items in the third array 106 represent nine smaller topics within the sub-topic associated with the media item $A23_{21}$.

The MDM can include a mechanism that allows a user to review textual metadata associated with any media item in any array, such as by rolling over a media item with a mouse device, or by right-clicking on a media item with the mouse device, and so on. For instance, the user can roll over media item $A_{23}$ in array 102 to determine, in one instance, that this media item represents sports programming. Alternatively, or in addition, the MDM can include a mechanism that allows a user to review a video snippet associated with a selected media item. Finally, the MDM can allow the user to activate any media item to formally consume that media item. For instance, each media item in the third array 106 may represent a different movie or a different scene within a single movie. Upon reaching this array 106, the user can activate any media item to watch the selected movie or scene within a movie. Still other navigation options are possible.

In one general navigational paradigm, the thread that links the arrays together in a particular navigation session is single-themed, meaning that the user advances from most general content to most detailed content (or vice versa) by applying a single criterion or a single combination of criteria. For instance, the use of a temporal linking criterion defines a single-themed navigational paradigm. In this example, the user moves from relatively large swaths of time within media content to successively more detailed segments within the media content. The path of this advancement is single-themed in the sense that it does not diverge by applying other criteria (besides the criterion of time) in its course. In another general navigational paradigm, the thread that links the arrays together in a particular navigation session is multi-themed, meaning that the MDM can dynamically vary the linking criteria as a discovery session proceeds. Examples of single-themed and multi-themed navigational paradigms will be discussed in greater detail below.

In another navigational paradigm, the linking criterion can operate in a negative or exclusive manner, enabling the user to iteratively advance to desired media content through a process of elimination. For instance, the MDM can interpret the user's activation of the media item $A_{23}$ in array 102 as an instruction that the user does not wish to see any media items which resemble media item $A_{23}$. The MDM can respond by compiling another collection of media items which specifically omit the type of content associated with media item $A_{23}$ and present those media items in the array 104.

The MDM can use yet additional kinds of navigational paradigms. As will be discussed below, in one case, the MDM can automatically apply predefined linking criteria to a discovery session. In another case, the MDM can solicit the preferences of the user and select linking criteria based on the user's preferences.

A.2. Examples of the User Interface Presentation (FIGS. 2 and 3)

Figure 2:
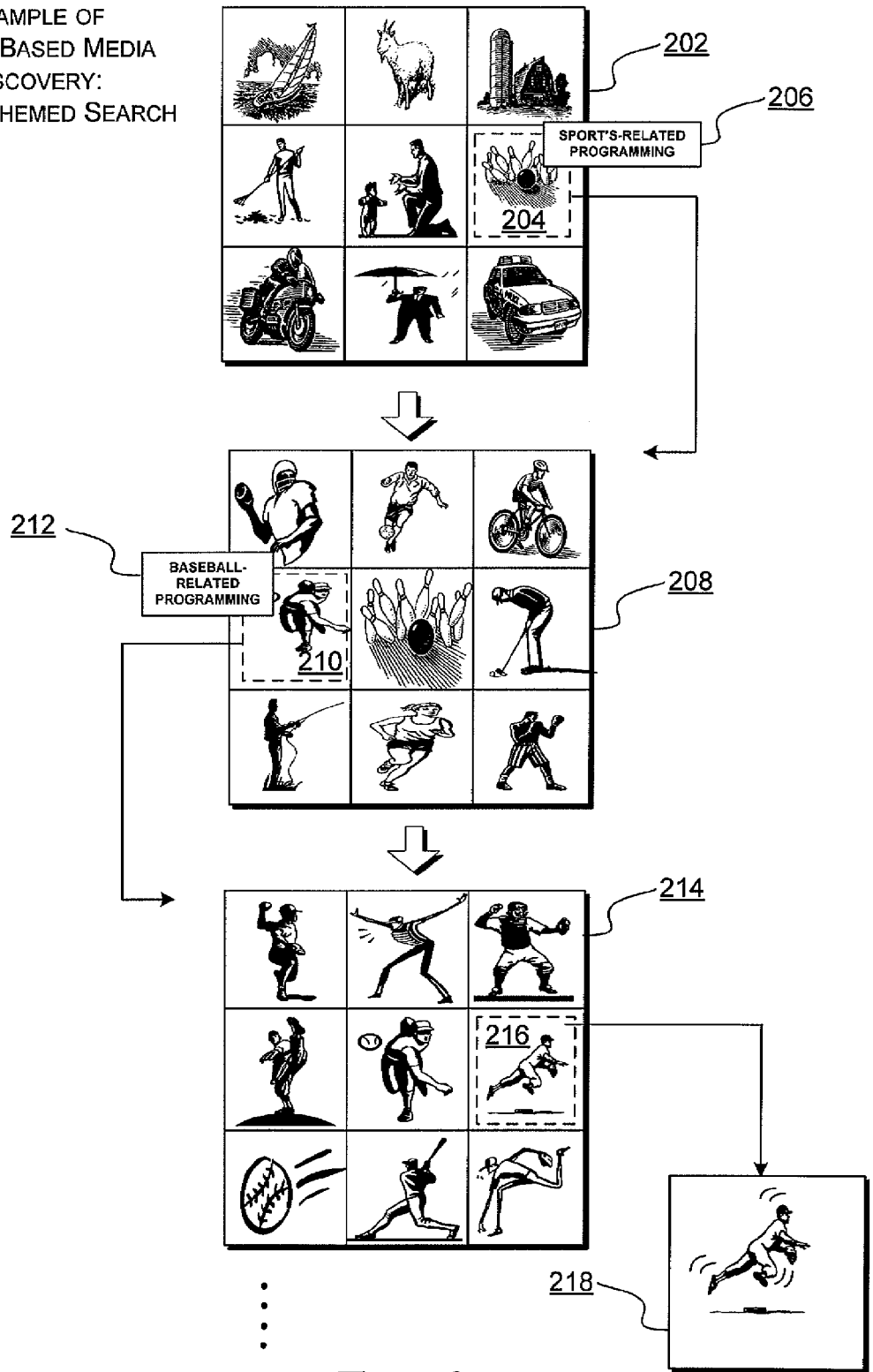
FIG. 2 shows a first exemplary application of the strategy of FIG. 1 which employs a single-themed navigation paradigm.
Figure 3:
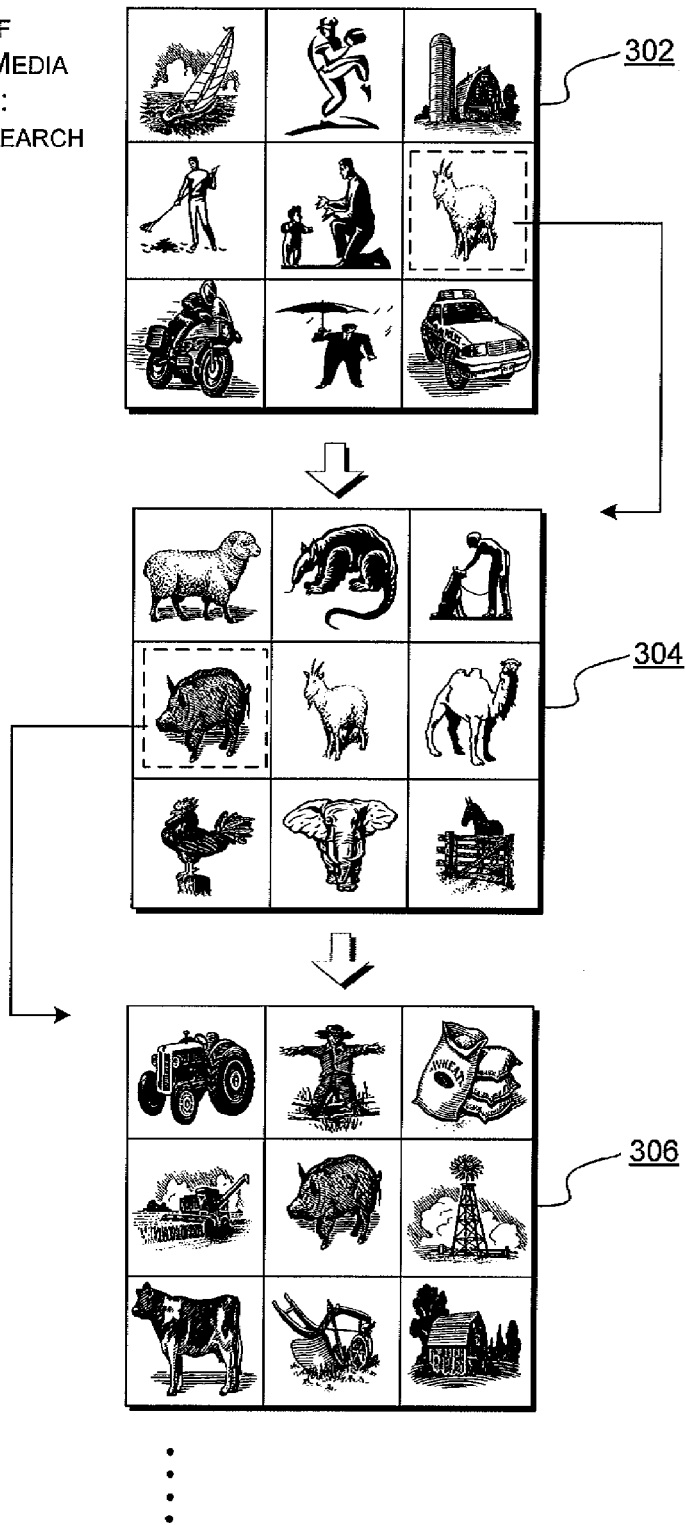
FIG. 3 shows a second exemplary application of the strategy of FIG. 1 which employs a multi-themed navigation paradigm.
Figure 4:
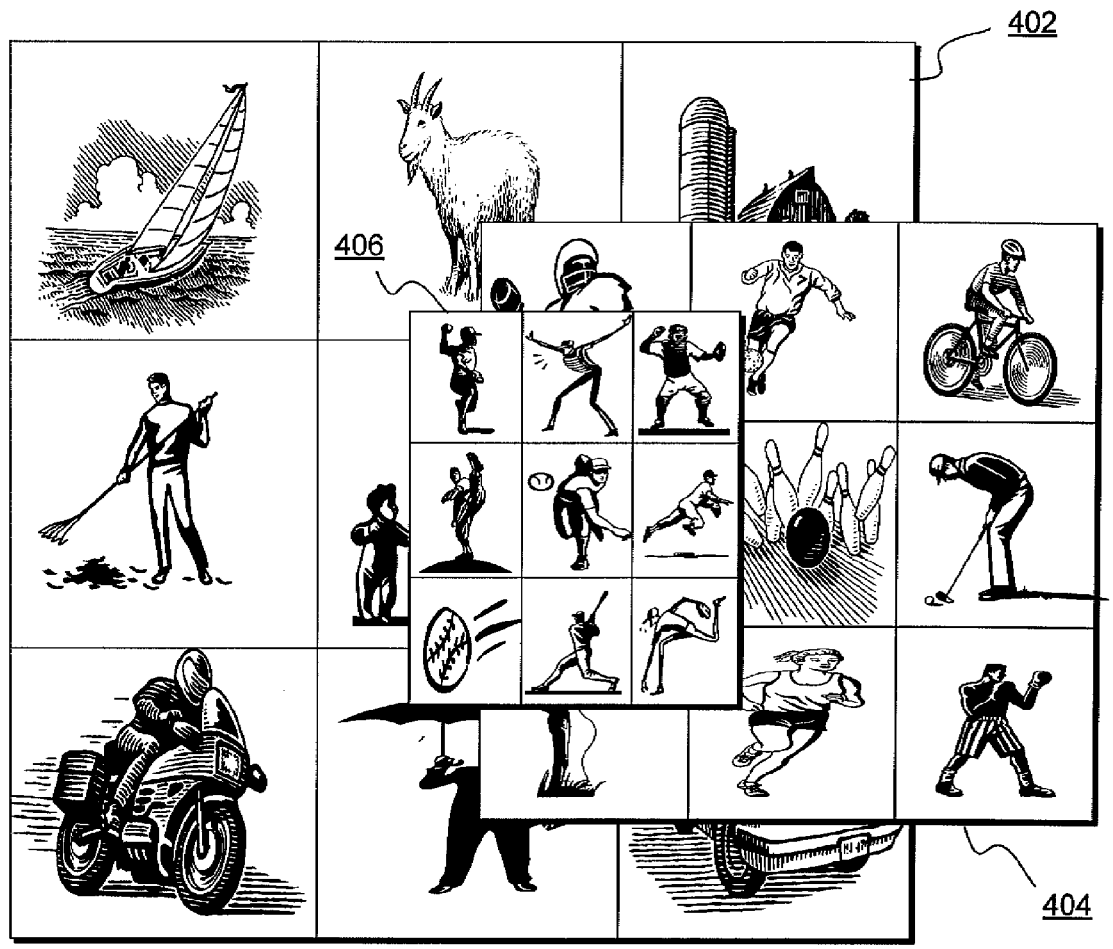
FIGS. 4-7 show various alternative ways of implementing the user interface strategy of FIG. 1.

FIGS. 2 and 3 present two examples of the application of the general discovery protocol set forth with respect to FIG. 1. More specifically, FIG. 2 shows the use of a single-themed navigational paradigm 200 in which the user is permitted to drill down within a single defined theme. FIG. 3 shows the use of a multi-themed navigational paradigm 300 in which the user is permitted to follow a more unconstrained path through a media search space; in this case, the linking criteria being applied to the search can dynamically vary as the user meanders through the media search space.

Starting with FIG. 2, the MDM begins by presenting a first array 202. The linking criterion being applied in this scenario is a topic-related criterion. In this case, the MDM groups a collection of media items into nine categories and displays a visual entry for each category within the array 202. For instance, the MDM may determine that there are 200 sports-related programs being offered. Accordingly, the MDM can select a video frame from one of these sports-related programs and display this video frame within cell 204 of the array 202. (In one case, the MDM can select a video frame from the most popular sports program.) Other cells in the array 202 represent selections from other categories of media items.

In addition, the MDM can incorporate a roll-over mechanism. For instance, when the user rolls over the media entry in the cell 204, the MDM can display metadata 206. The metadata 206 informs the user that, upon activation of this media item, the MDM will present further details regarding sports programming.

Assuming that the user does in fact activate the media item in cell 204, then the MDM provides another array 208 of media items. This array 208 presents nine media items that all pertain to sports programming. More specifically, each entry in the array 208 represents a different type of sporting event that can be selected. For instance, a media provider may offer 25 baseball-related programs to select from, The MDM can assign a video frame from one of these 25 baseball-related programs (such as the most popular baseball-related program) and display this visual entry in cell 210 of the second array 208. Further, the MDM can display metadata 212 that identifies the subcategory represented by the media item in the cell 210. In one exemplary and non-limiting case, the selected media item in cell 204 in the first array 202 also appears as one of the media items in the second array 208. For instance, the media item in cell 204 can be displayed as the middle entry in the second array 208.

When the user activates the media item in cell 210, the MDM presents yet another array 214 of media items. These media items contain visual entries that may correspond to video frames within respective baseball games or other baseball-related content (such as movies pertaining to baseball). Again, the media item in cell 210 can be redisplayed in the middle cell of the array 214. Thus, in general, this approach initially focuses the user's attention to the respective middle cells in the series of presented arrays.

Finally, the user may activate any media item in the array 214 to formally watch a program associated with the media item. For instance, in FIG. 2, the user has selected the media item allocated to cell 216 of the array 214. This prompts the MDM to display a sports program 218 associated with the selected media item. Moreover, although not shown, the MDM can permit the user to preview any media item shown in any array; this can prompt the MDM to display a video sample of the selected media item, such as in a thumbnail-type video presentation, also referred to as a picture-in-picture (PIP) presentation. Through this mechanism, the user can investigate a navigational option before formally committing to and invoking this option.

The navigational paradigm shown in FIG. 2 is referred to as multi-themed because this paradigm allows the user to drill down along a single theme. For instance, upon selecting a sports-related theme, the MDM allows the user to select successive gradations within this sports-related theme.

In contrast, FIG. 3 shows an example of a multi-themed navigational paradigm. In this case, the theme of discovery can dynamically vary as the user advances through the media search space. For instance, as in the case of FIG. 2, the MDM can initially present the user with an array 302 of media items that represent different genres of content from which the user may select. The user selects a media item in the array 302 associated with an animal-related theme, which prompts the MDM to present an array 304 of media items associated with different types of animals. If the single-themed navigational paradigm is applied, then activating any animal within the array 304 would prompt the MDM to display different instances of the selected animal. However, in the multi-themed paradigm, activation of an animal within the array 304 may possibly prompt the MDM to present an array of media items that share some other characteristic in common with the selected media item (besides the animal-related theme). For example, in the case of FIG. 3, the user has selected a media item that has a visual entry showing a pig. The MDM determines that this media item, of course, has a bearing on the theme of pigs. But the MDM also determines that this media item also has a relationship to a farming-related theme. Accordingly, activation of the pig-related media item in the array 304 may prompt the MDM to present an array of media items associated with a farming theme. In one case, media items can have various thematic affiliations of varying strengths; in selecting a topic to be used to populate a subsequent array of media items using the multi-themed navigational paradigm, the MDM can select the strongest affiliation.

In the above-described manner, the multi-themed navigation option allows the user to navigate through media discovery space in a meandering fashion, where the theme may drift in a manner that is not preestablished.

In the above examples, the MDM applies a single criterion to govern the presentation of a subsequent array of media items, where the single criterion remains the same throughout a search session (in the single-themed paradigm) or can dynamically vary over the course of a search session (in the multi-themed paradigm). However, the MDM can also apply various combinations of criteria, and these combinations of criteria can remain the same throughout a search session (in the single-themed paradigm) or can dynamically vary over the course of a search session (in the multi-themed paradigm).

A.3. Alternative Display Formats (FIGS. 4-7)

For frame of reference, FIGS. 2 and 3 show a user interface model in which the MDM presents successive arrays, with each array replacing its predecessor. For instance, in the example of FIG. 2, the MDM first presents the user with array 202. When the user activates the cell 204 in this array 202, the MDM removes the array 202 and presents the second array 208, which can have the same size as the first array 202. And when the user activates cell 210 in the second array 208, the MDM removes the second array 208 and presents the third array 214, which can have the same size as the first and second arrays (202, 208).

However, the MDM can employ other user interface formats. Consider, for example, FIG. 4. This model presents a user interface model in which the successive arrays are superimposed, with each array being placed on top of its predecessor without removing its predecessor. Each successive array is placed so that its center coincides with the center of the media item that has been activated in the predecessor array. Moreover, each successive array has a smaller size than its predecessor array.

For instance, the MDM initially presents the user with a first array 402. When the user activates a sports-related media item in the first array 402, the MDM presents a smaller second array 404 on top of the first array 402. The second array 404 is positioned so that its center coincides with the center of the sports-related media item in the first array 402. In a similar manner, when the user activates a baseball-related media item in the second array 404, the MDM presents a still smaller third array 406 on top of the second array 404. The third array 406 is positioned so that its center coincides with the center of the baseball-related media item in the second array 404. Still further iterations can be performed in the above-described manner, with each array becoming successively smaller, and the arrays being stacked on top of each other in cascaded fashion. This design is advantageous because it visually informs the user of the relationship of one array to another, allowing the user to visually trace the path of a discovery session and to also grasp the amount of detail associated with any media item in the series of arrays (based on the relative size of the media item). Other visual techniques can be used to show how the arrays are associated with each other.

Figure 5:
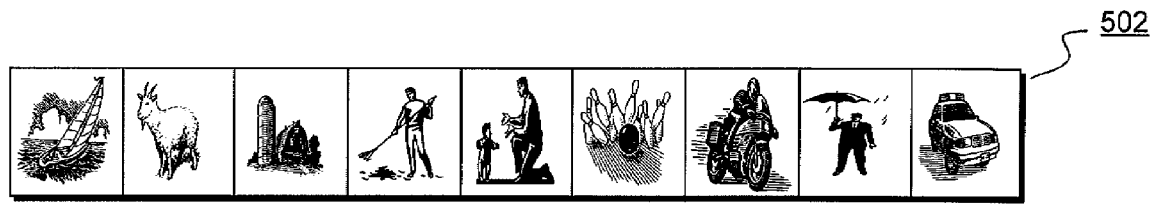
Figure 6:
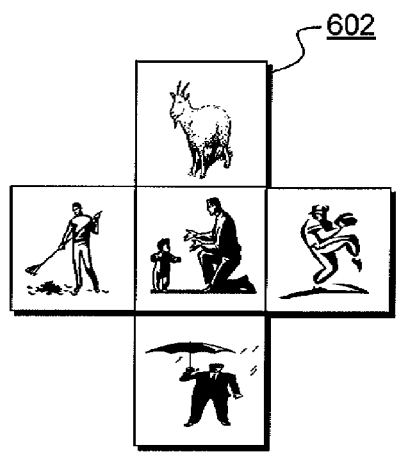
Figure 7:
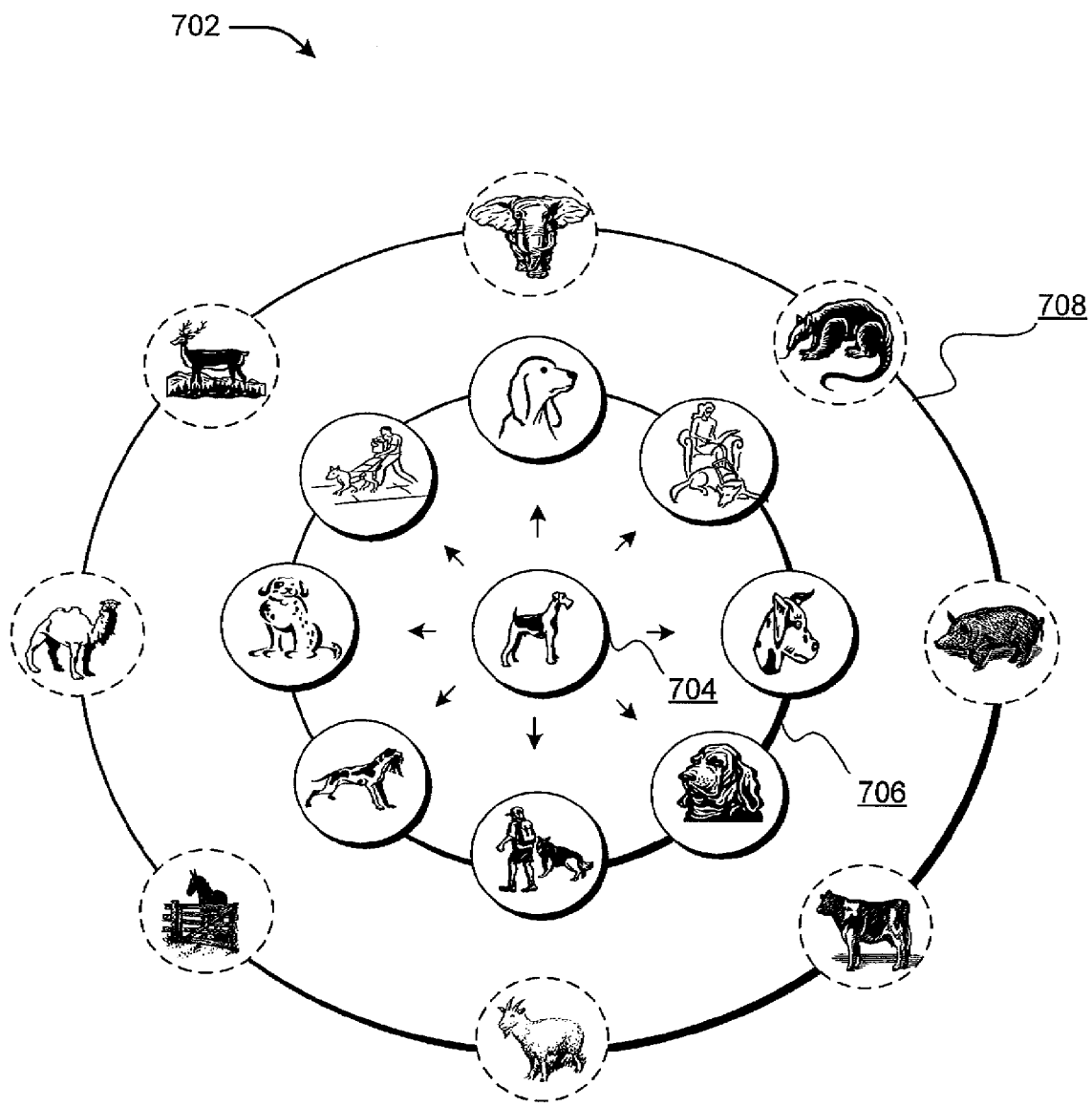

Advancing to FIGS. 5-7, these figures demonstrate that the exemplary 3×3 model shown in the preceding examples can be altered in various respects.

For instance, FIG. 5 shows that, instead of a 3×3 matrix, the MDM can present a 1×9 linear array 502 of media items, arranged in a row or column, like a filmstrip. The user can activate any media item in the array 502, which prompts the MDM to present another 1×9 array of media items (not shown) in the same manner described above. This format may be particularly desirable for a linking criterion that lends itself to linear depiction, such as the temporal-based linking criterion.

FIG. 6 shows another array 602 that includes four media items arranged in the shape of a cross (by removing the diagonal elements shown in the 3×3 arrays of FIGS. 2 and 3). The user can activate any media item in the array 602, which prompts the MDM to present another cross-type array of media items (not shown).

FIG. 7 shows another user interface presentation that includes an array 702 that has successive concentric rings of media items. The user can activate any media item in the array 702, which prompts the MDM to present another ring-type array of media items (not shown).

The array 702 shown in FIG. 7 is also a useful vehicle to discuss an additional navigation model that can be optionally employed by the MDM. In this model, the area encompassed by the concentric rings shown in FIG. 7 represents a media search space. The media item shown in the center of the rings can represent the current focus of the user's discovery session. The distance between the centrally disposed media item and any orbiting media item represents the strength of the similarity between the centrally disposed media item and the orbiting media item. When the user selects a media item in the array 702, the selected media item assumes the role of the centrally disposed media item in a redrawn array.

For instance, assume that the user is currently focused on a media item that represents a dog, depicted by a centrally disposed media item 704. Logically, the MDM can determine that the media items that are most similar to the media item 704 also feature dogs. Accordingly, the media items in a ring 706 that surrounds the centrally disposed media item 704 also show depictions of dogs. However, more remote rings have a correspondingly more remote relationship to the dog shown in the centrally disposed media item 704. For instance, another ring (not shown) may represent pets in general, another ring 708 may represent mammals in general, and so on. In this example, the rings progress from most relevant to least relevant as the distance from the center of the array 702 increases; but it is also possible to configure the array 702 such that the rings progress from least relevant to most relevant as the distance from the center of the array 702 increases. The concentric ring model may be useful in certain circumstances. For instance, this model can allow the user to select a desired media item without necessarily iterating through a series of arrays. A similar effect can be achieved using a model that presents concentric rectangles or other geometrical shapes.

In yet another application of the array 702, the media items can represent different time segments. The centrally disposed media item can represent a movie itself, and successive rings can represent the partitioning of the movie up into successively smaller time segments. In this model, for instance, the outermost ring can represent the finest temporal gradations of movie content. Any pie-shaped wedge in this presentation can represent the division of a particular scene in the movie into successively smaller segments.

Another user interface model (not shown) can employ an array that includes a tree-type structure. The user can activate any node in this array to reveal a collection of child nodes. Activation of any child node can reveal another, further embedded, collection of child nodes, and so on. This model is advantageous because it clearly conveys the hierarchical relationship among the media items.

Still further user interface models are possible, including multi-dimensional display models in which the user is permitted to explore media items through a multi-dimensional media search space.

A.4. Strategies for Entering User Preferences (FIGS. 8 and 9)

As can be appreciated from the above discussion, the behavior of a discovery session can be governed by a number of rules and criteria. In one implementation, the MDM can automatically determine the best rules and criteria to apply and then automatically apply those rules and criteria during a search session (without soliciting the user's preferences). In another case, the MDM can solicit the user's input as to the desired rules and criteria that are applied by the MDM during a discovery session. This subsection identifies two exemplary user interface models that can be used to receive such user preferences.

FIG. 8 shows a user interface presentation 802 in which the MDM collects general preference information from the user that will generally apply to all subsequently conducted discovery sessions. The exemplary user interface presentation 802 asks the user a number of questions. First, the user interface presentation 802 may ask the user whether the user wishes the MDM to apply a temporal linking criterion or a subject matter-related criterion. If the user instructs the MDM to apply a subject matter-related criterion, the user interface presentation 802 asks the user whether the user wishes to entrust the MDM to automatically select the linking criteria that will be applied or whether the user wishes to manually specify the linking criteria that will be applied. If the user wants to manually select the linking criteria, the user interface presentation 802 asks the user to specify the techniques which should be used to determine the characteristics of the media items, including one or more of content recognition techniques or metadata analysis techniques, and so on. If the content recognition option is selected, the user interface presentation 802 gives the user the option of identifying whether an audio recognition technique is to be used, an image recognition technique is to be used, and so on. If the metadata option is selected, the user interface presentation 802 gives the user the option of identifying whether an EPG analysis technique is to be used, a close-captioning analysis technique is to be used, and so on. The specific queries shown in FIG. 8 are illustrative of many other types of preference information that can be collected from the user, wherein such preference information governs the subsequent behavior of the MDM in conducting a discovery session.

Figure 9:
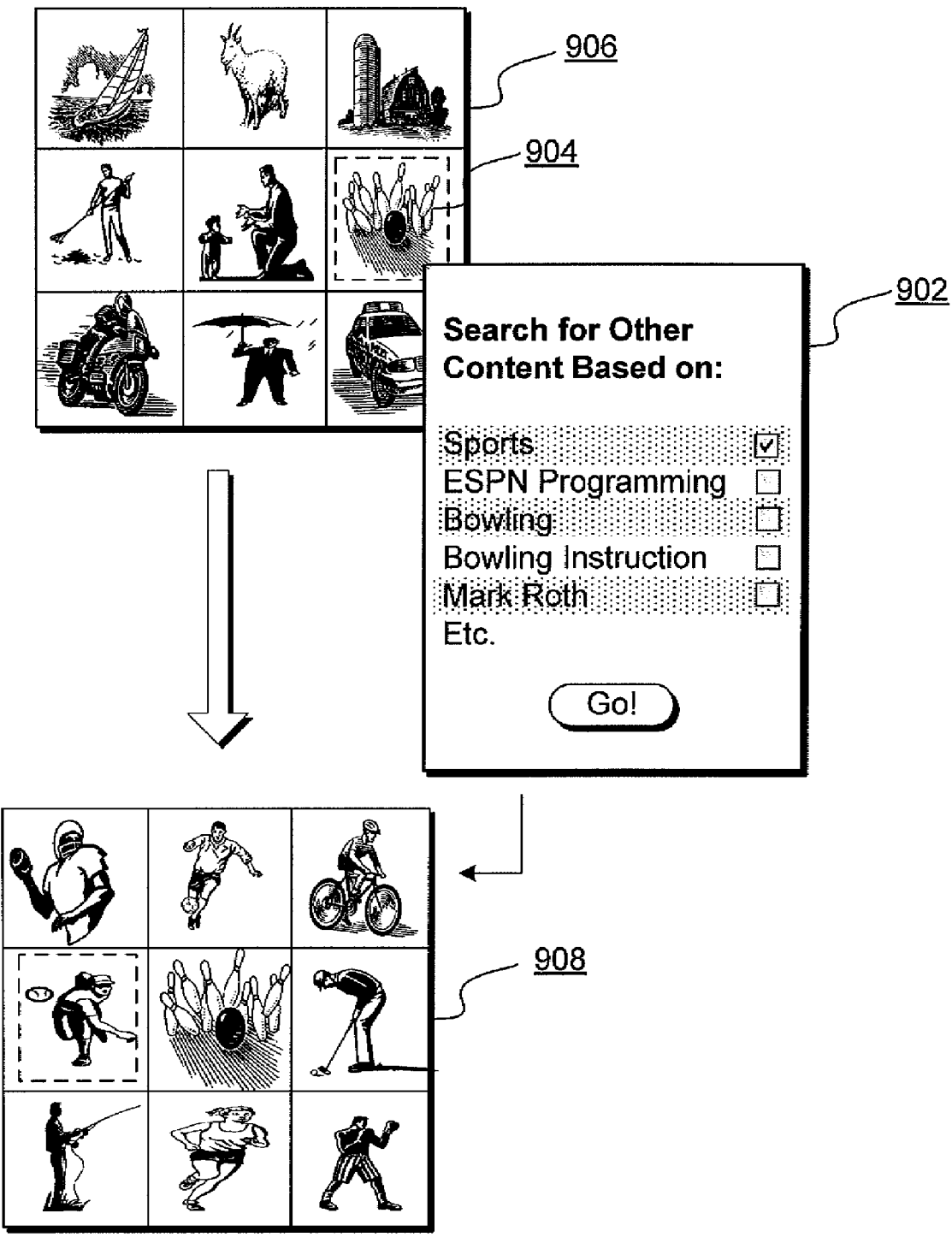
FIG. 9 shows an exemplary user interface technique that allows a user to enter session-specific navigation-related preferences in the course of a particular media discovery session.

By contrast, FIG. 9 shows a user interface presentation 902 that can be used in the course of a specific discovery session to govern the course of this specific discovery session. In other words, the preference information entered via the user interface presentation 902 locally controls the discovery session to which it applies.

In the example shown in FIG. 9, the user has activated a media item 904 within a first array 906 of media items. The MDM uses the user interface presentation 902 to inform the user of various characteristics of the media item 904, such that this media item pertains to sports as a general theme and is associated with the channel ESPN. The user interface presentation 902 also informs the user that this media item 904 pertains to bowling, and more particularly, to classic bowling instructional presentations, and even more particularly, to the professional bowler Mark Roth, and so on. In response to selecting one or more characteristics via the user interface presentation 902, the MDM presents another array 908 of media items. Each item in that array 908 has some association with the characteristics identified via the user interface presentation 902 (in this case, the user has identified a general sport-related theme, so the media items in the array 908 generally pertain to sports, rather than to bowling in particular). In this manner, the user is given some local control over the path that a discovery session takes. Still further strategies can be used to enter search criteria. In another case (not shown), a user can mark parts of image content and instruct the MDM to find other media items that have similar image content. The MDM can allow the user to mark parts of image content by, for instance, tagging the content with a symbol of some kind, drawing a circle around the content, and so forth. Using this strategy, the user can draw a circle around the bowler Mark Roth's head and instruct the MDM to find other media items that include the same or similar facial features.

B. Exemplary System (FIGS. 10-13)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

B.1. Exemplary Media Discovery Module (MDM) (FIGS. 10 and 11)

Figure 10:
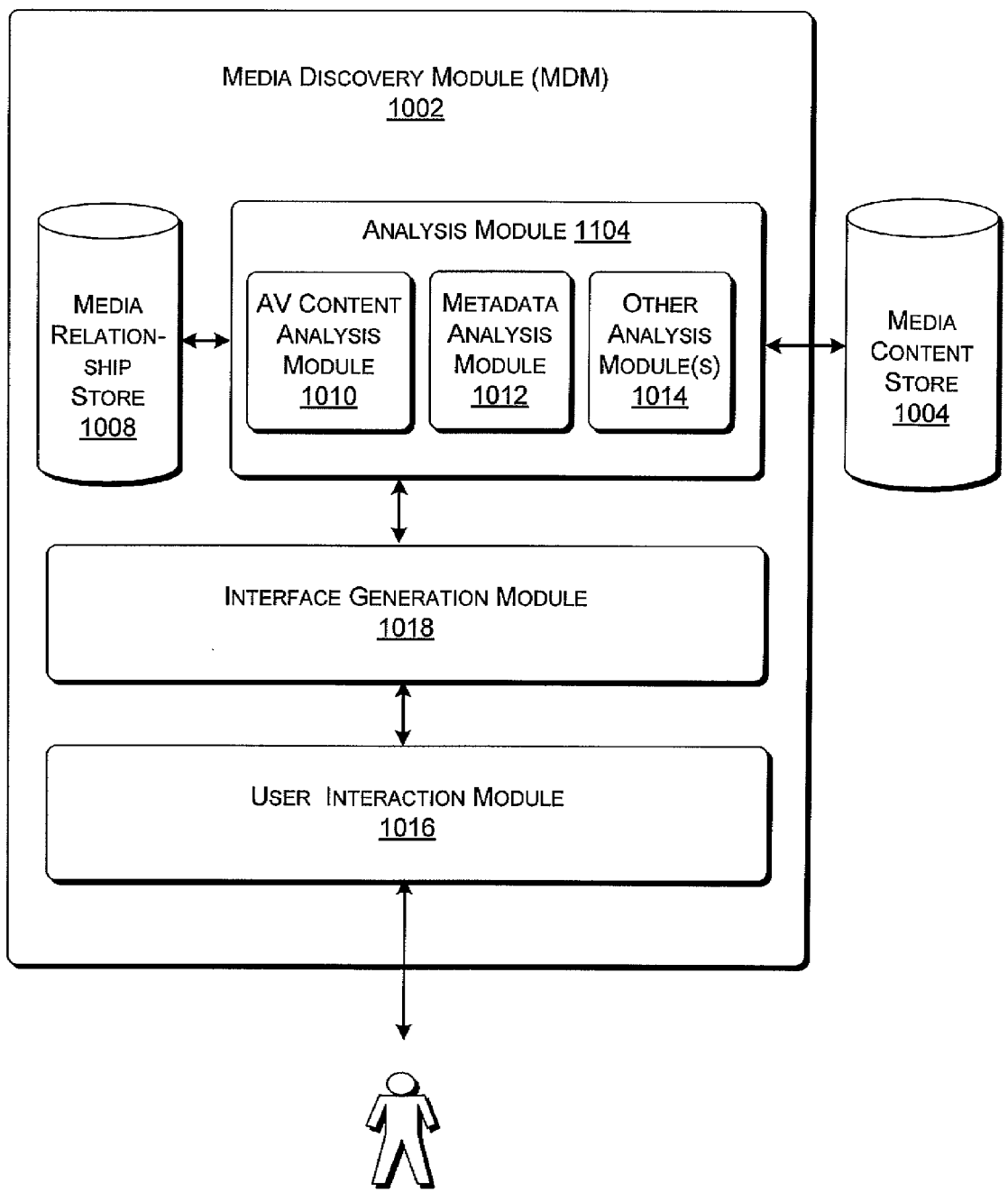
FIG. 10 shows an exemplary media discovery module (MDM) that can be used to implement the user interface presentations shown in FIGS. 1-9.
Figure 11:
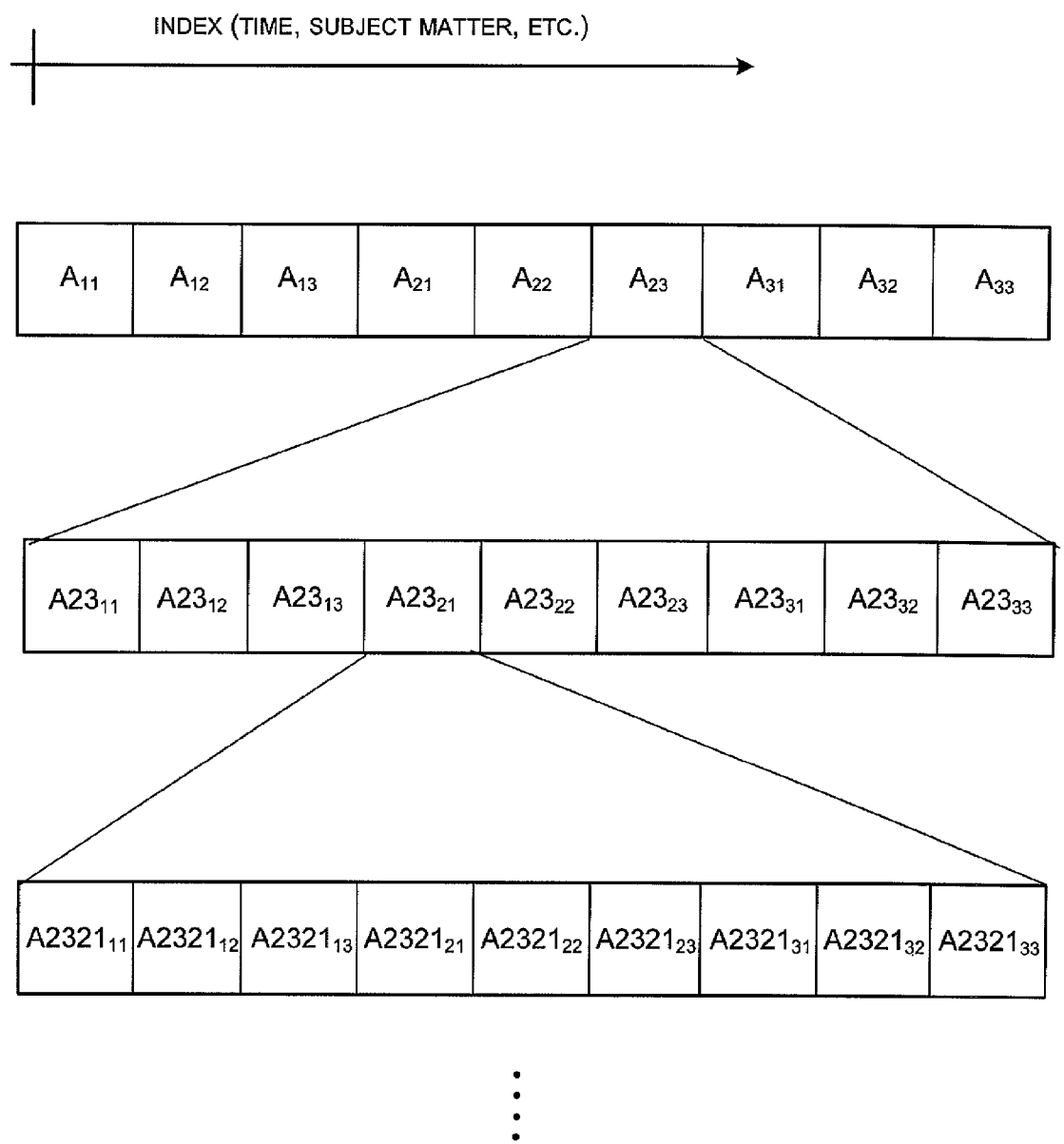
FIG. 11 shows an exemplary manner for constructing a series of arrays of media items using the MDM of FIG. 10.

FIG. 10 shows an exemplary composition of a Media Discovery Module (MDM) 1002 that can provide any of the user interface presentations illustrated in the previous section. The MDM 1002 interacts with a media content store 1004 which stores a potentially large collection of media items. The media items can pertain to any of the resources described above, such as television programs, movies, digital photographs, and so on. Parts of a single media resource are also referred to as media items herein.

The MDM 1002 includes an analysis module 1006. The purpose of the analysis module 1006 is to determine the characteristics of the media items in the media content 4 store 1004, and to assess the relationship among the media items based on the assessed characteristics. The analysis module 1006 stores the results of its analysis in a media relationship store 1008.

The analysis module 1006 can operate in an offline manner, an online manner, or in a manner that employs a combination of offline and online processing. In the offline mode of processing, the analysis module 1006 determines one or more relationships among media items before the user conducts a discovery session. In the course of a later discovery session, the MDM 1002 can rely on the predetermined relationship information stored in the media relationship store 1008 to present a series of arrays. For instance, the analysis module 1006 can determine that a group of media items in the media content store 1004 pertains to a sports-related genre, and further that plural sub-groups of media items pertain to specific types of sports. Thus, when the user activates a hierarchical top-down sports-related search, the MDM 1002 can provide the appropriate arrays of media items based on the pre-populated results stored in the media relationship store 1008. In the online mode, the analysis module 1006 can assess the characteristics of media items and the relationships among media items as a discovery session unfolds. In the hybrid offline/online mode, the analysis module 1006 can determine certain characteristics and relationships prior to a discovery session, and other characteristics and relationships dynamically in the course of a discovery session.

The analysis module 1008 can rely on a number of tools to assess the characteristics of media items, such as an audio-visual (AV) analysis module 1010, a metadata analysis module 1012, and any other kind of analysis module(s) 1014. The AV analysis module 1010 determines the characteristics of media items by analyzing the audio and/or visual content of the media items. For example, the AV analysis module 1010 can employ face recognition tools to identify the same person within multiple media items, scene recognition tools to identify the same scene within multiple media items, and so on. The AV analysis module 1010 can employ voice recognition tools to identify the same speaker within multiple media items, speech recognition tools to identity the same words within multiple media items, music analysis tools to identity similar genres of music (such as predominately quiet music, music with a characteristic beat), and so forth. The metadata analysis module 1012 can assess the characteristics of the media items by examining EPG-related data, close-captioning data, and/or any other textual information that may accompany the media items.

The grouping performed by the analysis module 1008 can likewise rely on various tools. In one case, the analysis module 1008 can group media items into buckets associated with different characteristics depending on whether the media items possess such characteristics. In another case, the analysis module 1008 can rely on more advanced algorithms (e.g., statistical algorithms) to group media items, such as cluster analysis, and so on.

The MDM 1002 also includes a user interface module 1016 for interacting with the user.

The MDM 1002 also includes an interface generation module 1018 for preparing any kind of user interface presentation discussed in Section A in response to the analysis performed by the analysis module 1006 and the user's selections received via the user interaction module 1016.

FIG. 11 shows how media items can be linked together in the media relationship store 1008. In this example, one media item ($A_{23}$) in a first array of media items is associated with plural media items in a second array of media items. One media item ($A23_{21}$) in the second array of media items is associated with plural media items in a third array of media items, and so on. The media relationship store 1008 can record the above-identified relationships in any manner, such as via linked lists, etc.

B.2. Overview of One Exemplary System (FIG. 12)

The MDM functionality described herein can be employed in many different environments. In one case, for instance, the MDM functionality can be applied in a local setting to organize media items that are locally archived (including AV content, photographs, etc.) In this case, for instance, the MDM module 1002 can be implemented by a personal computer, a digital video recorder (DVR), and so on. In another case, the MDM functionality can be applied in a networked system that is used to deliver media items to a user in streaming fashion. While not limited to the second scenario, the MDM functionality will be explained below primarily in the context of a streaming media environment.

Figure 12:
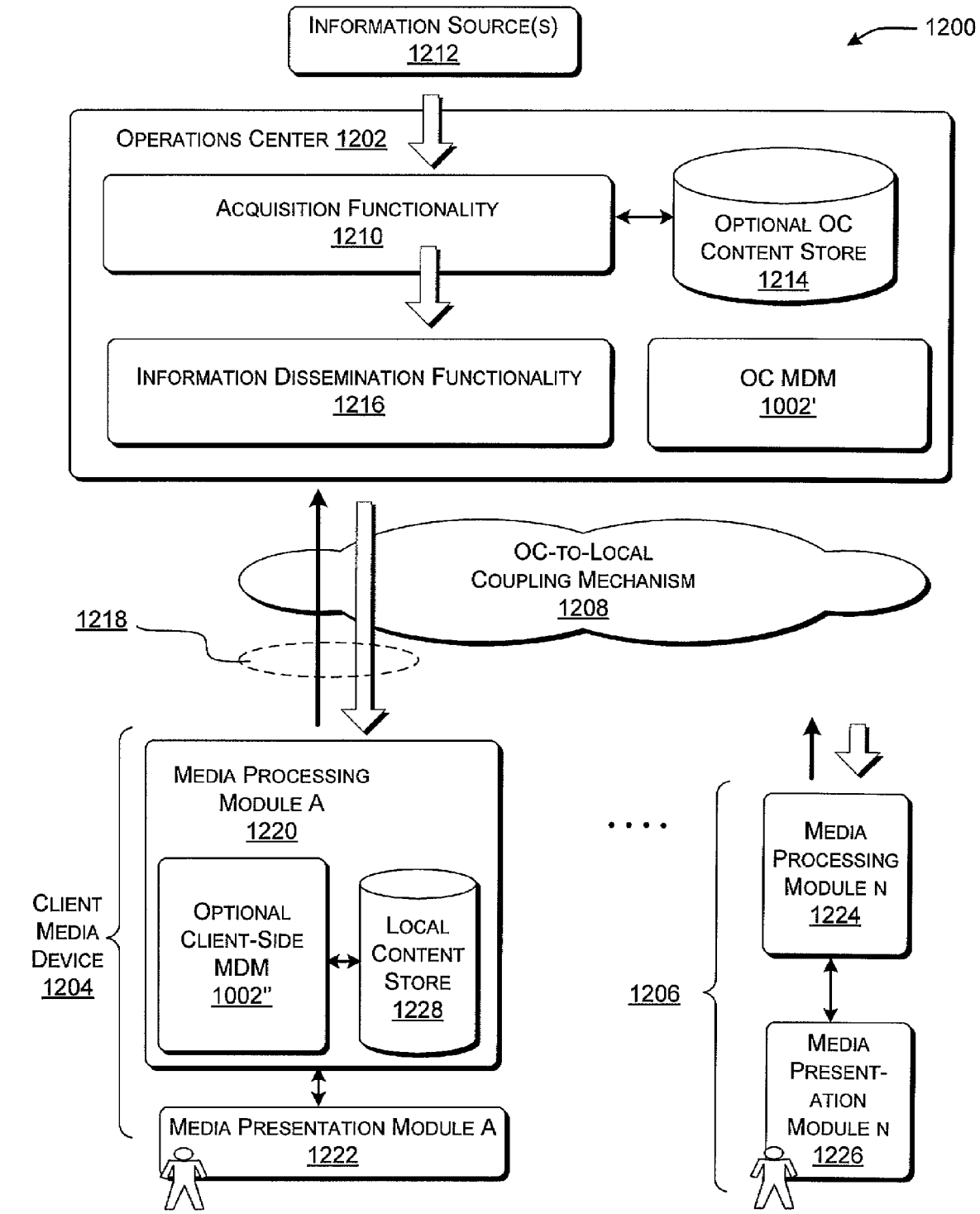
FIG. 12 shows one exemplary system that can incorporate the MDM of FIG. 10.

FIG. 12 shows one media streaming system 1200 that can incorporate the MDM 1002. By way of overview, the system 1200 includes an operations center 1202 for delivering media programs to a collection of client devices (1204, ... 1206) via a coupling mechanism 1208. The operations center 1202 includes acquisition functionality 1210 for supplying the programs from one or more sources 1212 of such information. The sources 1212 can represent any kind of entity which produces or provides media information, such as cable or satellite television providers, one or more Video-On-Demand (VOD) providers, one or more publishing houses of information, one or more library sources, any kind of Internet-enabled repository, and so on. The acquisition functionality 1210 can comprise one or more server computers or other functionality dedicated to the task of retrieving the media information. The operations center 1202 can optionally also include an information content store 1214 for storing the media information prior to its dissemination to the client devices (1204, ...

1206). The information content store 1214 can be implemented as one or more databases and associated database management functionality. The system operations center 1202 can also include information dissemination functionality 1216 for supplying media information to the client devices (1204, . . . 1206) via the coupling mechanism 1208. The information dissemination functionality 1216 can be implemented as a collection of server modules (not shown) that facilitate the transmission of media information to the client devices (1204, . . . 1206).

The coupling mechanism 1208 couples the operations center (OC) 1202 to the client devices (1204, . . . 1206), and is therefore labeled in FIG. 12 as an OC-to-local coupling mechanism. This coupling mechanism 1208 can be implemented in different ways to suit different technical and commercial environments. For instance, the coupling mechanism 1208 can include any kind of network (or combination of networks), such as a wide area network (e.g., the Internet), an intranet, Digital Subscriber Line (DSL) network infrastructure, point-to-point coupling infrastructure, and so on. The coupling mechanism 1208 can use or involve any kind of protocol or combination of protocols. In the case in which one or more digital networks are used to disseminate information, the coupling mechanism 1208 can include various hardwired and/or wireless links, routers, gateways, name servers, and so on. In the case where DSL infrastructure is used to disseminate information, the coupling mechanism 1208 can utilize the services, in part, of telephone coupling infrastructure and DSL processing functionality.

The architecture shown in FIG. 12 includes one or more downlink paths and one or more optional uplink paths. One pair of downlink and uplink paths is illustrated in FIG. 12 as pair 1218. The downlink paths are used to forward media programs to the client device (1204, . . . 1206). The optional uplink paths can be used to forward user selections and other information to the operations center 1202. The uplink and downlink paths can be implemented by the same communication mechanism, or by different respective communication mechanisms.

Now referring to the client-side aspects of the system 1200, the client devices (1204, . . . 1206) can be implemented in different ways. A given client device (1204, . . . 1206) can represent a television set with integral IP interfacing/processing functionality, a television set with an associated set-top box coupled thereto, a digital video recorder (DVR) device, a rewritable digital video disc (DVD-RW) device, a personal computer having AV processing functionality, a music playback system, a portable personal media device, and so forth (as well as any combination of these devices). In whatever manner the client devices (1204, . . . 1206) are implemented, each of these devices can comprise a media processing module that is communicatively coupled to a media presentation module. For instance, the client device 1204 includes media processing module 1220 coupled to media presentation module 1222, and the client device 1206 includes media processing module 1224 coupled to a media presentation module 1226. The media processing modules (1220, . . . 1224) comprise functionality for processing the media information and performing other data processing functions, and the media presentation modules (1222, . . . 1226) comprise functionality for presenting the output of the media processing modules (1220, . . . 1224). The media processing modules (1220 . . . 1224) can be integrated with the media presentation modules (1222, . . . 1226), or the media processing modules (1220, . . . 1224) can be separate from (but communicatively coupled to) the media presentation modules (1222, . . . 1226).

FIG. 12 shows an overview of the exemplary composition of the representative client device 1204. This device 204 includes the media processing module 1220, which, in turn, can comprise a local content store 1228. The media processing module 1220 in conjunction with the local content store 1228 can be used to implement media recording functionality, such as digital video recording (DVR) functionality, also referred to as personal video recording (PVR) functionality.

The system 1200 also includes the MDM 1002. As described at length above, the purpose of the MDM 1002 is to interact with the users to present a series of arrays of media items. A user may access the MDM 1002 when attempting to find a media resource to watch. Thus, the MDM provides a discovery paradigm that either supplements or entirely replaces the use of a conventional EPG.

In one implementation, the MDM 1002 is entirely implemented by the operations center 1202. FIG. 12 represents this implementation by showing an MDM 1002' in the operations center 102. In another implementation, the MDM 1002 can be entirely implemented by the client devices (1204, . . . 1206). FIG. 12 shows this implementation by showing an MDM 1002" in the client device 1204. In another implementation, the MDM 1002 can be implemented in a distributed fashion by functionality in both the operations center 1202 and the client devices (1204, . . . 1206). Still further implementations are possible.

B.3. Exemplary Client-Side Processing Equipment (FIG. 13)

Figure 13:
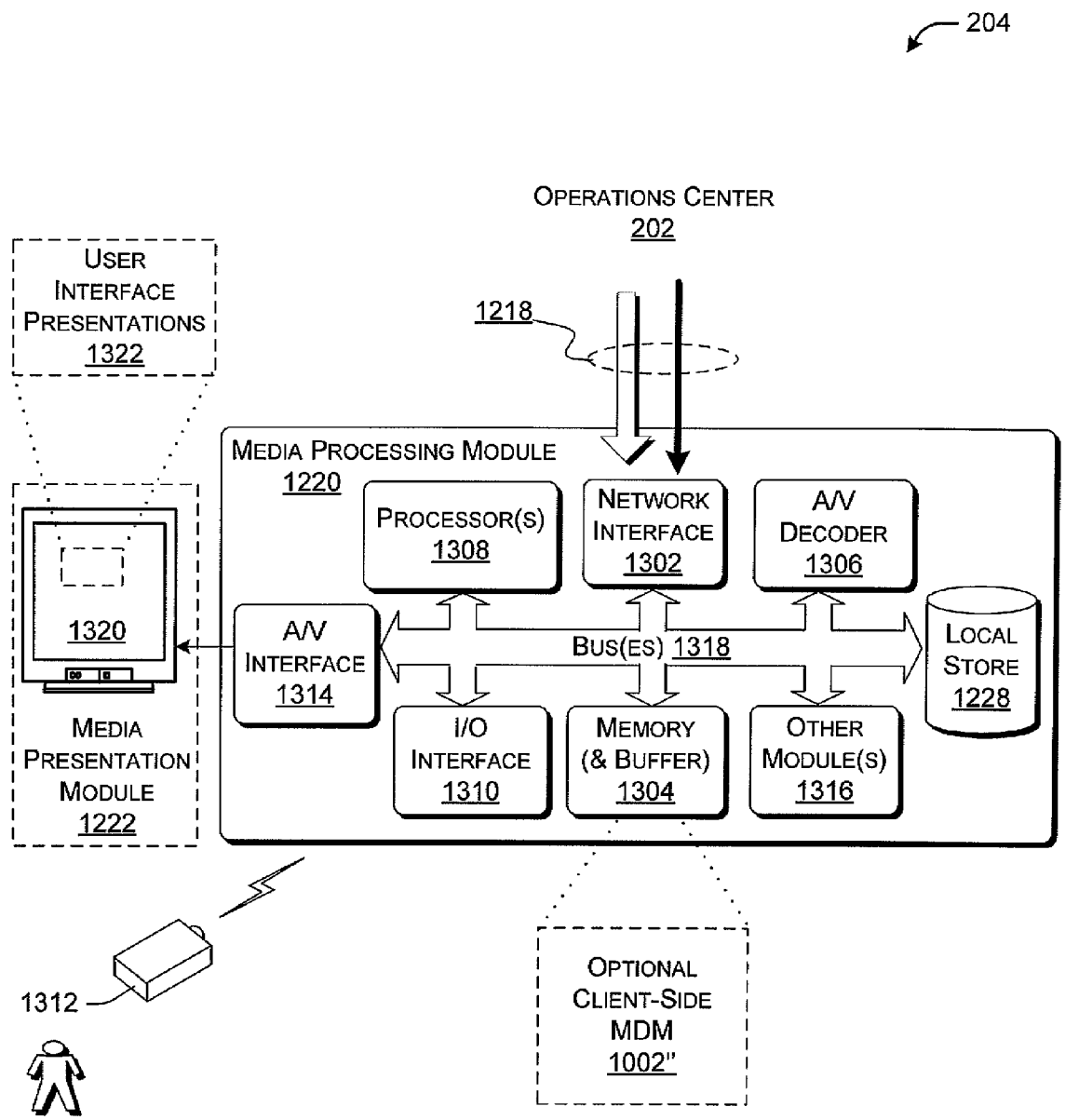
FIG. 13 shows an exemplary client device that can be used in the system of FIG. 12.

FIG. 13 provides additional details regarding the representative client media device 1204 (introduced in the context of FIG. 12). To review, the media client device 1204 itself comprises the above-identified media processing module 1220 coupled to the media presentation module 1222.

The media processing module 1220 can include a number of modules for performing its ascribed tasks. To begin with, the media processing module 1220 includes a network interface module 1302. The network interface module 1302 can represent any functionality for receiving media information from the operations center 1202 using any coupling mechanism. For example, the network interface module 1302 can comprise an Ethernet NIC, a DSL modem, a cable modem, a wireless network interface, or other kind of network interface equipment. The media processing module 1220 also includes memory 1304. A portion of the memory 1304 can optionally comprise program instructions for implementing the client-side MDM 1002". The media processing module 1220 also includes an audio-visual (AV) decoder 1306 for decoding (and decompressing) the received media information into its video and audio components. Decoding comprises ordering packets (if received out of order), extracting media information from the stream of received packets, and also extracting timing information that will govern the playback of the media information. The media processing module 1220 also includes one or more processors 1308 for executing instructions to implement the functionality of the media processing module 1220. The media processing module 1220 also includes an I/O interface 1310 for interacting with the user via one or more input devices, such as a remote controller 1312, a personal computer (not shown), a joy stick (not shown), a voice recognition mechanism (not shown), and so forth. The media processing module 1220 also includes an A/V interface module 1314 for providing media information in an appropriate format to the media presentation module 1222. The media processing module 1220 also includes the above-identified local store 1228 for storing recorded programs and other data. Finally, the client processing module 1220 can include various other modules 1316, not specifically identified by name in the figure. For instance, the client processing module 1220 can include a graphics compositor for combining a video component of the media information from the AV decoder 1306 on a frame-by-frame basis with graphics information. The graphics information may comprise various user interface presentations which are overlaid on the media information. One or more busses 1318 communicatively couple the above-identified components together.

The media presentation module 1222 can comprise any kind of device for presenting AV information, including a CRT-type device, an LCD-type device, and so forth. In any case, the media presentation device 1222 defines a display surface 1320. The media processing module 1222 can present one or more user interface presentations 1322 on the display surface 1320.

As a final note, although not shown, the components of the operations center 1202 can be implemented by one or more server type computers and/or other processing is equipment. These computers or equipment can have a basic architecture which is similar to that illustrated in FIG. 13, namely, comprising processors, memory, various interfaces, various buses, and so on.

C. Exemplary Method of Operation (FIGS. 14 and 15)

Figure 14:
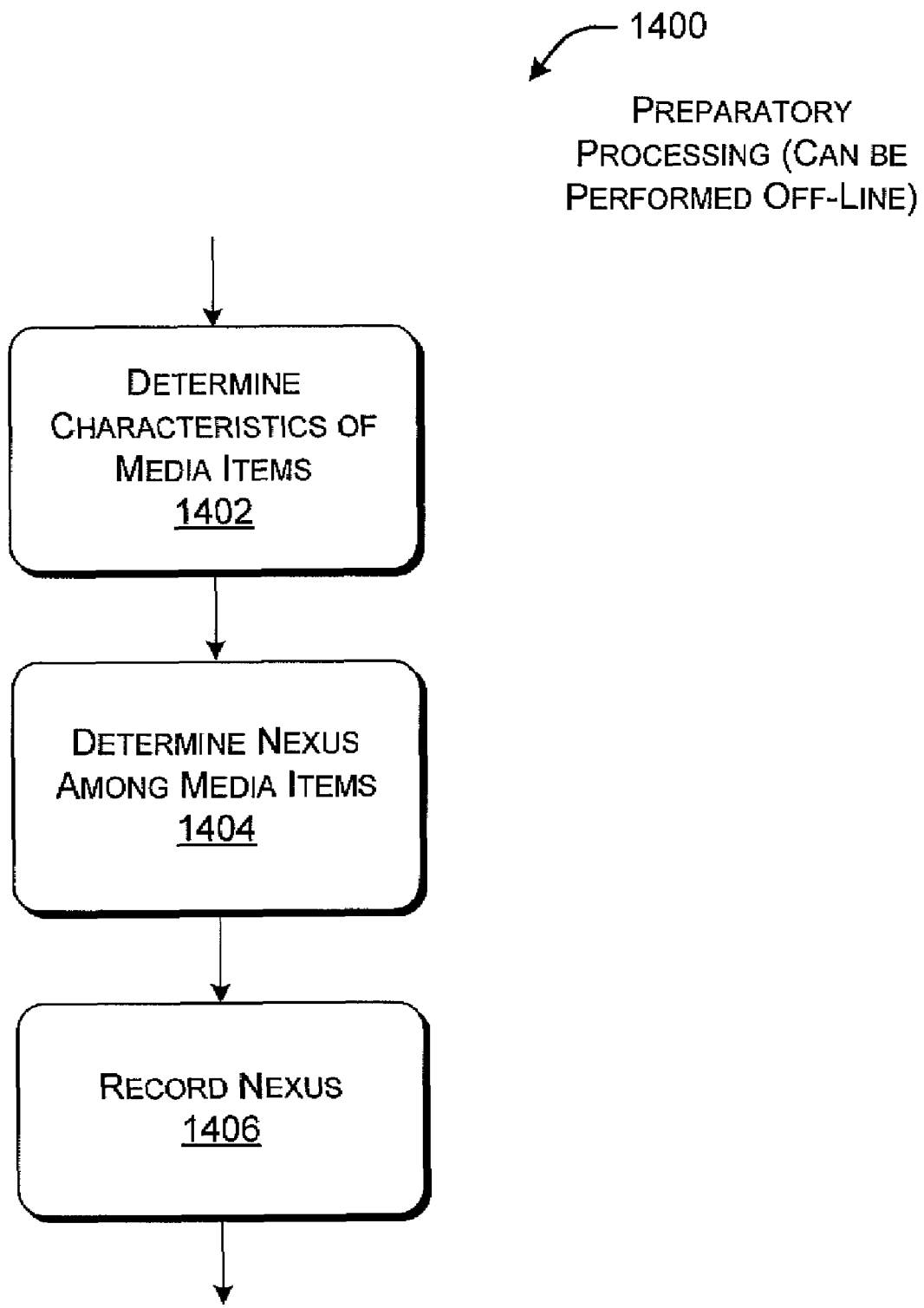
FIG. 14 shows an exemplary procedure for establishing at least one relationship among a collection of media items.
Figure 15:
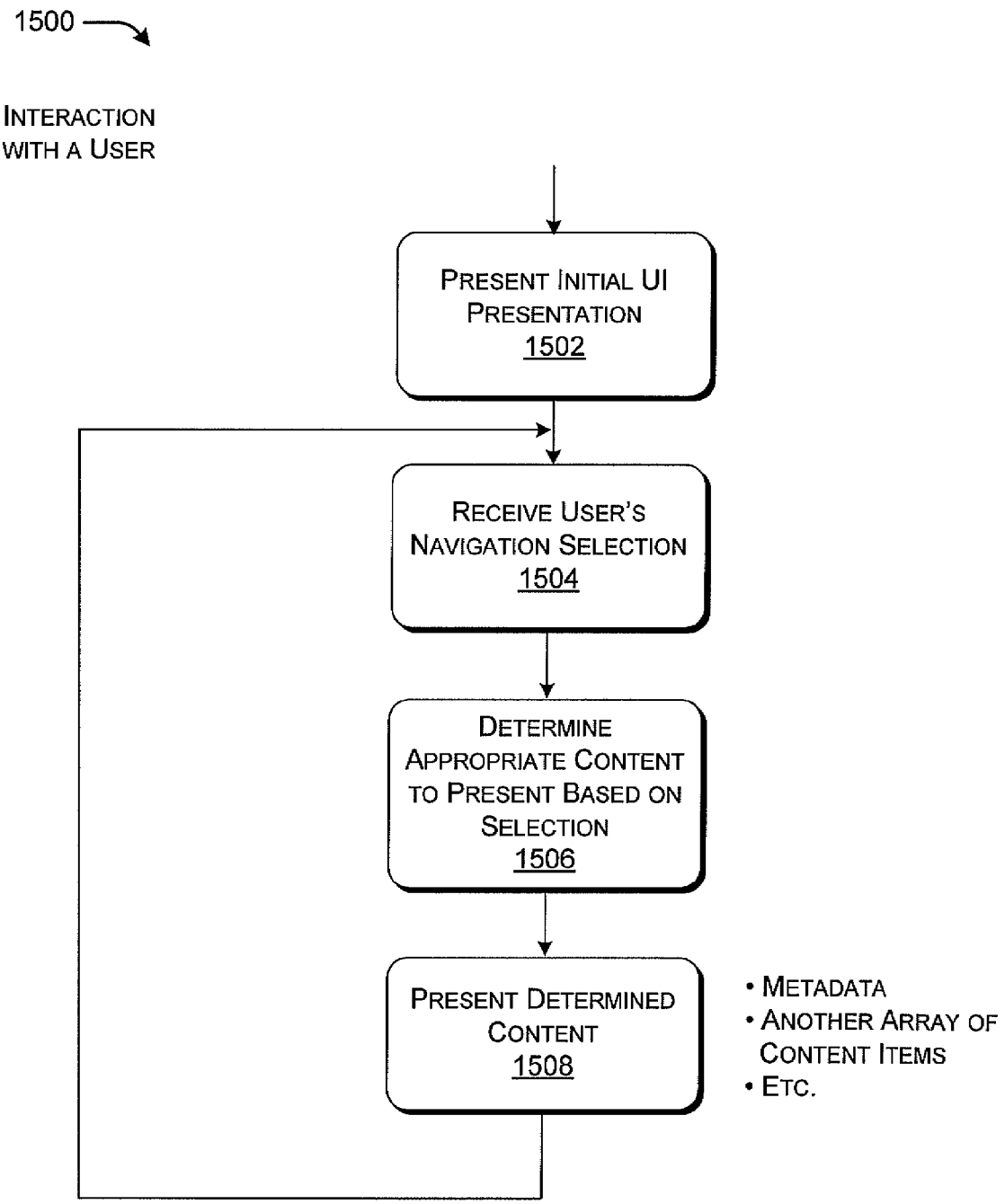
FIG. 15 shows an exemplary procedure for presenting a series of arrays of media items to a user in response to selections made by the user.

FIGS. 14 and 15 describe the operation of the MDM 1002 in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in prior sections, Section C will serve primarily as a review of those functions.

C.1. Analyzing Media Items

FIG. 14 shows a procedure 1400 for determining the relationship among a plurality of media items. In one case, this procedure 1400 can be performed in offline fashion. In another case, this procedure 1400 can be performed in an online manner. In still another case, this procedure 1400 can be performed in a manner that combines both online and offline processing.

In step 1402, the MDM 1002 determines one or more characteristics of the media items based on AV analysis (that is, audio and/or image analysis) and/or metadata analysis and/or any other kind of analysis.

In step 1404, the MDM 1002 determines, based on the assessed characteristics, the relationship among the plurality of media items. For instance, this step may comprise grouping together media items that share the same (or similar) characteristics.

In step 1406, the MDM 1002 stores the relationships determined in step 1404.

C.2. Providing a Series of Arrays of Media Items

FIG. 15 shows a procedure 1500 that allows a user to receive a series of arrays of media items based on the user's selections.

In step 1502, the MDM 1002 presents a first array of media items to the user based on one or more default considerations. For instance, where a time-based linking criterion is used, the MDM 1002 can present a first array of media items which partitions a media resource into a set of nine equal time segments. In the case where the linking criterion is subject matter-related, the MDM 1002 can present a first array of media items which partitions a collection of media items into nine genres.

In step 1504, the MDM 1002 receives the user's selection. This may comprise receiving a roll-over event, a mouse click event, and so forth In any event, in this step 1502, the user has somehow registered interest in one of the media items in the initial array of media items.

In step 1506, the MDM 1002 determines appropriate content to be presented based on the user's selection received in step 1504. This step 1506 may comprise accessing the media relationship store 1008 to determine how a selected media item in the initial array is related to another collection of media items that can be presented in a second array.

In step 1508, the MDM 1002 presents the content that has been determined in step 1506. The displayed content can comprise another array of media items, metadata associated with a selected media item in the initial array, and so on.

FIG. 15 includes a feedback loop which directs the process back to step 1504, in which case the MDM 1002 receives another selection from the user, this time in the context of the second array of media items. In this manner, the procedure can be repeated any number of times until the user finds a media resource which matches his or her interests.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for discovering media items, implemented on a computing device by a processor configured to execute instructions that, when executed by the processor, direct the computing device to perform acts comprising:

providing a first array of media items to a user;

receiving the user's selection of a media item in the first array of media items to provide a second array of media items, the second array of media items including a selected media item from the first array and a media item other than the media items found in the first array, wherein the selected media item from the first array is representative of a linking criterion linking the media items in the second array of media items, the selected media item from the first array is displayed in a middle cell of the second array of media items;

removing the first array;

presenting the second array of media items to the user based on the linking criterion which associates the selected media item with other media items not found in the first array;

analyzing the media items to identify a characteristic of each one of the media items and, based on the characteristic, and identify a relationship among a collection of media items, the analysis comprising:

analyzing visual contents via face recognition and scene recognition;

analyzing audio contents via voice recognition, speech recognition, and music analysis;

assessing characteristics of the media items by examining data including electronic program guide-related data, close-captioning data, and textual information accompanying the media items;

recording the relationship identified by the analysis module in a linked list;

wherein the media items are grouped into buckets associated with the characteristic of each one of the media items depending on whether the media items possess the characteristic and the media items presented to the user in the second array are determined by the identified relationship; and wherein the first and the second array comprise a nxm array of media items, wherein $n \geq 2$ and $m \geq 2$.

2. The method of claim 1, wherein each array provided by the method has a predetermined number of media items.

3. The method of claim 1, further comprising repeating the receiving and presenting at least one additional time to provide at least a third array of media items.

4. The method of claim 1, wherein subsequent iterations of the receiving and presenting conform to a single-themed model in which the user's navigation through a media search space defines a path that conforms to a single theme.

5. The method of claim 1, wherein subsequent iterations of the receiving and presenting conform to a multi-themed model in which the user's navigation through a media search space defines a path that encompasses multiple themes.

6. The method of claim 1, wherein the linking criterion is a time-based criterion, and wherein the second array of media items presents temporal divisions within a time interval associated with the selected media item, wherein a length of the temporal divisions presented in the second array of media items is a length of the time interval associated with the selected media item divided by a number of media items in the second array.

7. The method of claim 1, wherein the linking criterion is a subject matter-based criterion, and wherein the second array of media items presents subject matter-based divisions within a general subject matter associated with the selected media item.

8. The method of claim 1, wherein the linking criterion is a subject matter-based criterion, and wherein the second array of media items presents subject matter-based divisions within a general subject matter associated with the selected media item further comprising selecting the second array of media items based on analysis of metadata associated with a collection of candidate media items.

9. The method of claim 8, wherein the metadata is electronic program guide (EPG) data.

10. The method of claim 1, wherein the linking criterion is a subject matter-based criterion, and wherein the second array of media items presents subject matter-based divisions within a general subject matter associated with the selected media item further comprising selecting the second array of media items based on analysis of wherein the metadata is close-captioning data associated with a collection of candidate media items.

11. The method of claim 7, further comprising selecting the second array of media items based on analysis of media content associated with a collection of candidate media items.

12. The method of claim 1, wherein the linking criterion is a subject matter-based criterion, and wherein the second array of media items presents subject matter-based divisions within a general subject matter associated with the selected media item and further comprising selecting the second array of media items based on analysis of media content associated with a collection of candidate media items, wherein the analysis of media content comprises audio recognition analysis.

13. The method of claim 1, wherein the linking criterion is a subject matter-based criterion, and wherein the second array of media items presents subject matter-based divisions within a general subject matter associated with the selected media item and further comprising selecting the second array of media items based on analysis of media content associated with a collection of candidate media items, wherein the analysis of media content comprises image recognition analysis.

14. The method of claim 1, further comprising receiving a selection from the user that specifies at least one preference regarding the linking criterion.

15. The method of claim 14, wherein the receiving of the selection comprises collecting said at least one preference prior to a discovery session.

16. The method of claim 14, wherein the receiving of the selection comprises collecting said at least one preference in the course of a discovery session.

17. One or more machine-readable media containing machine-readable instructions for implementing the method of claim 1.

18. A computing device, comprising:
a processor;
a memory;
a media discovery module for discovering media items, including:
a user interaction module to receive user selections and provide user interface to a user based on the user selections;
an interface generation module to create the user interface presentations, including:
a first component to provide a first array of images representing media items to the user, wherein the media items comprise different media resources or parts of a single media resource;
a second component to receive, via the user interaction module, a user selection of a media item from the first array;
a third component to present a second array of media items to the user including the media item from the first array selected by the user and a media item other than the media items found in the first array, the selected media item from the first array is displayed in a middle cell of the second array of media items;
a fourth component to remove the first array;
an analysis module to identify a characteristic of each one of the media items and, based on the characteristic, a relationship among a collection of media items, the analysis module comprising:
a visual analysis module to analyze visual contents via face recognition and scene recognition;
an audio analysis module to analyze audio contents via voice recognition, speech recognition, and music analysis;
a metadata analysis module to assess characteristics of the media items by examining data including electronic program guide-related data, close- captioning data, and textual information accompanying the media items;
a media relationship store to record the relationship identified by the analysis module in a linked list;
wherein the analysis module groups the media items into buckets associated with the characteristic of each one of the media items depending on whether the media items possess the characteristic and the media items presented to the user in the second array are determined by the identified relationship;
wherein the first and the second array comprises a nxm array of media items, wherein $n \geq 2$ and $m \geq 2$.

* * * * *

UNITED STATES PATENT AND TRADEMARK OFFICE
CERTIFICATE OF CORRECTION

| | | |
|---|---|---|
| PATENT NO. | : 7,668,867 B2 | Page 1 of 1 |
| APPLICATION NO. | : 11/276937 | |
| DATED | : February 23, 2010 | |
| INVENTOR(S) | : Ronald A. Morris et al. | |

It is certified that error appears in the above-identified patent and that said Letters Patent is hereby corrected as shown below:

In column 20, line 51, in Claim 18, delete "close- captioning" and insert -- close-captioning --, therefor.

Signed and Sealed this
Twenty-fifth Day of January, 2011

David J. Kappos
*Director of the United States Patent and Trademark Office*